No. 662,352. Patented Nov. 20, 1900.
E. CHILDS.
CUTTER BODY AND METHOD OF MAKING SAME.
(Application filed Mar. 29, 1899.)
(No Model.)
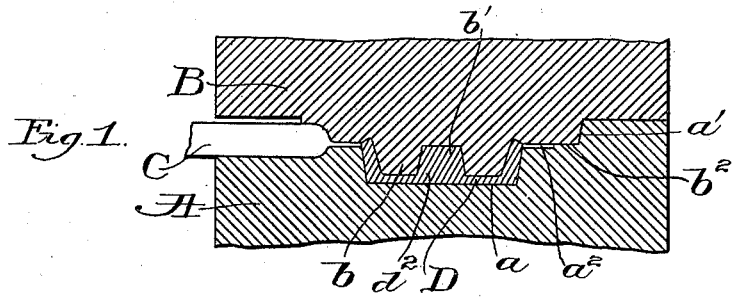
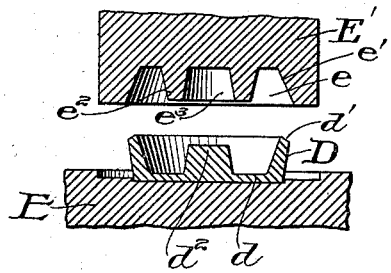
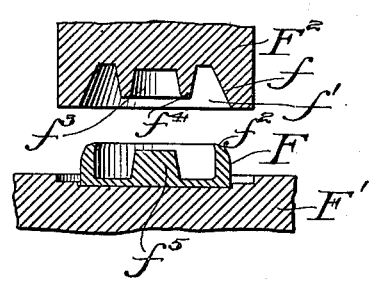
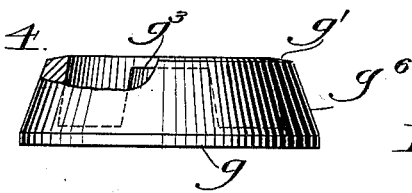
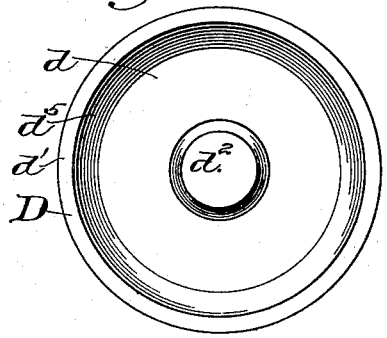
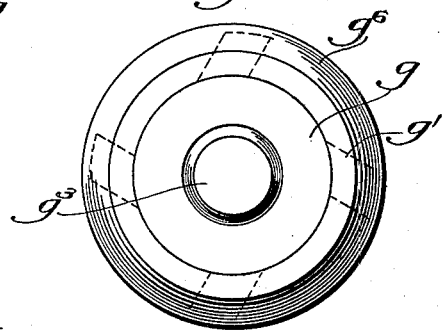
Witnesses.
Gustave F. Magnitzky.
Thomas F. Drummond
Inventor.
Eugene Childs
by Crosby Gregory
Attys
THE NORRIS PETERS CO., PHOTO-LITHO., WASHINGTON, D. C.

UNITED STATES PATENT OFFICE.

EUGENE CHILDS, OF BOSTON, MASSACHUSETTS, ASSIGNOR TO THE BOSTON SHOE TOOL COMPANY, OF SAME PLACE.

CUTTER-BODY AND METHOD OF MAKING SAME.

SPECIFICATION forming part of Letters Patent No. 662,352, dated November 20, 1900.

Application filed March 29, 1899. Serial No. 710,871. (No model.)

*To all whom it may concern:*

Be it known that I, EUGENE CHILDS, of Boston, county of Suffolk, and State of Massachusetts, have invented an Improvement in Cutter-Bodies and Method of Making the Same, of which the following description, in connection with the accompanying drawings, is a specification, like letters on the drawings representing like parts.

This invention relates to the production of a novel cutter-body for the manufacture of rotary trimmer-cutters and to a novel method of producing said cutter-body.

Heretofore solid one-piece rotary trimmer-cutters have been produced from a disk of steel cut from a bar of the desired diameter, said disk being held by a suitable chuck or otherwise and being provided at one end with an annular groove, and then by a suitable tool held in the cutter the inner and outer vertical wall of the groove has been undercut to present an inclined wall, and by another tool the exterior of the disk has been cut to present an exterior wall substantially parallel with the inner inclined wall, and the thin wall so produced, by a turning operation on both sides, is then cut vertically at places to leave segments, the ends of which are sharpened for the production of a series of cutting-blades. The shaping of the body of the cutter from a solid steel disk by turning is a slow operation, one requiring very considerable time of the operative attending the machine, and the expense of producing the cutters is very considerable. I have by experiment discovered a novel and cheap method of producing rapidly and economically the bodies of this class of cutters, my method also resulting in producing a body which is less apt to contain flaws than when made by a turning operation. These bodies may be sold to manufacturers of rotary trimmer-cutters and be slotted by them. In accordance with my improved method I heat one end of a bar of steel, and when at the proper forging heat I place the hot end of the bar in position between a male and a female die, and by the movement of said dies, one toward the other, they are made to close on the hot end of the bar and give to it the shape of a conic frustum, the smaller base of the frustum presenting solid metal, while the larger base presents an annular wall surrounding an annular groove containing a central stud, the interior of the annular wall tapering outwardly from the smaller base of the frustum toward the larger base. This conic frustum must next be reversed at its exterior—that is, the base of largest diameter must be made of least diameter. This is done by subjecting the larger base, it presenting a circular wall, to uniform external pressure, the circular line of pressure exerted on the exterior of the wall decreasing in diameter until the outwardly-flaring larger base of the conic frustum is made the smallest base of the cutter-body, and it may be sold to people making a business of manufacturing cutters for sale and use. This body may be made into a rotary trimmer-cutter by slotting the annular wall transversely at preferably four points and filing one of the edges at each slot to present a sharp cutting edge. The inner wall of a cutter completed from a body such as described will when subsequently tempered be left softer than would be the case if the wall was made by a cutting operation, as first described, this being due to the fact that in the tempering operation I find that the forged skin of the body left to constitute the inner side of the annular wall and the inner side of each blade of the cutter does not cool as rapidly, and consequently does not harden as thoroughly, as the turned outer wall where the forged skin is removed, and this feature, discovered by me, adds greatly to the durability of the cutter, for it may in consequence thereof be ground more readily and uniformly and the tendency of the blades to break in use is greatly lessened.

One part of my invention consists in a novel cutter-body consisting of a forged frusto-conical piece of metal presenting solid metal at its largest base and an annular wall at its smallest base, said wall surrounding a central hub. Also in the method of producing cutter-bodies, which consists in heating a metal blank, subjecting it while hot to the operation of dies to give to the blank a frusto-conical shape exteriorly, the smaller base presenting solid metal and the larger base presenting an annular wall, and then again subjecting the frusto-conical forging to the action of other dies to simultaneously act on the larger base and contract it uniformly to a less diameter than the smaller base, thereby producing a frusto-conical body presenting at its largest base solid metal and at its smallest base an annular wall of metal.

Figure 1 shows a die closed upon a heated bar, the extremity of the bar being represented as having given to it the shape required by the action of said dies. Fig. 2 shows a second pair of dies and the forging represented in Fig. 1, it having been suitably sheared from the bar and presented in place ready to be acted upon by the descending die. Fig. 3 represents the forging which will be produced in the die represented in Fig. 2 put in place ready to be acted upon by the descent of a third die to be described. Fig. 4, on a somewhat enlarged scale, represents the cutter-body which will be formed by the descent of the third die. Fig. 5 is a top or plan view, enlarged, of the first shape given to the body in the first die. Fig. 6 is a like view showing the annular wall reversed, it also representing a top view of the body represented in Fig. 1; and Fig. 7 shows a completed cutter.

The female die A may be mounted on a suitable bed and the male die B may be carried by a suitable drop or plunger, they normally standing apart. These dies have suitable passages leading from their outer sides into the die-cavities for the steel bar C, from which the cutter-bodies are to be forged. The end of this bar is suitably heated, and when the disks are separated the hot end of said bar is pushed in between the faces of the dies, so that the said end substantially overlaps the cavity $a$ of the die A. The cavity $a$ is frusto-conical in shape, the walls of the cavity flaring from the bottom of the cavity outwardly. The male die presents a frusto-conical projection $b$, having a central hole $b'$, said frusto-conical portion $b$ being represented as extended from a shouldered part $b^2$ of the die B, said shouldered portion entering a suitable recess $a'$ in the top of the female die A. The female die A has about the upper wall of its cavity a smaller annular space $a^2$, which receives the flash left by the action of the dies A B upon the end of the hot bar, and when the said dies are closed the metal at the end of the hot bar has given to it the shape represented in Fig. 1, the bar extending outwardly from the said dies, as represented in said figure. This is the first operation, and the dies are then separated to remove the first forging D, which by a suitable shearing operation is severed from the bar and has the flash removed from the annular wall at one edge of the forging. This forging D (shown in Figs. 1 and 2) consists, essentially, of solid metal, (shown at $d$,) it constituting the smaller base of a conic frustum, the larger base of said frustum presenting, as at $d'$, an annular wall inclined at its interior outwardly from the said solid end to the edge of said wall, the central space of the said forging, looking at it from its larger base, presenting a hub $d^2$, connected with the solid smaller base and standing centrally in the open annular end of the larger base of the forging. This forging D is set into a suitable recess of a block E, suitably sustained rigidly, and said forging is acted upon by a die E', represented as having an annular groove $e$, presenting an outwardly-flared inner wall $e'$, the said groove having standing within it a teat $e^2$, having a central bore or chamber $e^3$. As the die E' approaches the support E, the outwardly-inclined wall $e'$ of the die E' meets the outer edge of the annular wall of the larger base of the frusto-conical forging D and acts on said annular wall uniformly throughout its circumference, contracting the annular wall of the forging, the die E' in its descent causing the hole $e^3$, made in the teat $e^2$, to pass over the central hub $d^2$ of the forging D and contact therewith as or just before the inclined wall $e'$ of the die completes its descent in contact with the outer side of said wall, the teat $e^2$ acting to center the forging in case it should for any reason be out of center. When the die E' completes its descent, it so acts upon the forging D as to leave it in substantially the condition shown by the forging F, (represented in Fig. 3,) wherein it will be seen that the outer annular wall rising from the larger base of the frusto-conical forging has been so contracted that the inner wall or side of the annular flange stands substantially vertical rather than inclining outwardly, as in Fig. 2. The forging F is laid upon a suitable base F' under a moving die F², it having substantially the same construction as the die E', with the exception that the inner inclined wall $f$ of the die-groove $f'$ is more accurately tapered than the corresponding wall $e'$ in Fig. 2. As the die F² is caused to descend upon the forging F the inclined inner wall $f$ presented by the annular groove $f'$ made in said die meets the upper annular edge $f^2$ of the forging, and the central hole $f^3$ in the teat $f^4$ in its descent embraces the central hub $f^5$ of the forging F, as before described, it operating substantially as the hub represented in Fig. 2, and by the time that the said die F² has completed its descent the annular wall $f^2$ has been reversed from its position shown in Fig. 2, said wall being brought substantially into the position shown in Fig. 4, said figure showing the completed body for a trimmer-cutter, it presenting a frusto-conical body, the larger base $g$ of which presents solid material, and the smaller base $g'$ presenting an annular wall the inner side of which is tapered reversely from the taper represented in Figs. 1 and 2, the hub $g^3$ standing in the center of the space presented at the smaller base of the frusto-conical body.

Fig. 5 shows enlarged the forging D, made by the operation of the dies represented in Fig. 1, it presenting, as stated, at its larger base an annular wall $d'$, surrounding an annular space having rising from the bottom $d$ thereof a hub $d^2$, the bottom $d$ representing solid metal and constituting the smaller base of a frusto-conical body, the inner wall $d^5$ flaring outwardly.

Referring now to Fig. 6, showing the completed body, but having different letters, the smaller base $g$ corresponds with the larger base $d$ of the forging, Fig. 5, and the hub $g^3$ corresponds exactly with the hub $d^2$; but instead of the annular wall flaring outwardly and constituting the larger base of the frusto-conical body said wall has been contracted uniformly to present a smaller circle, as $g'$, it constituting in Fig. 6 the smaller base of the frusto-conical body, and the said wall instead of being left tapering from the solid part $g$ outwardly is made to present an inward taper, a taper just the reverse of that shown in Fig. 5, and, preferably, also the outer wall $g^6$ of said body, Fig. 6, is tapered to correspond substantially in direction and inclination with the taper at the interior of said frusto-conical body. To finish this body and make of it a rotary trimmer-cutter, the wall will be slotted or cut through on the dotted lines, Fig. 6, to present a series of segmental blades, and one edge of each slot will be sharpened to present an edge for said blades, and the segmental blades will be filed or shaped externally to present a proper clearance. (See Fig. 7.)

I find in practice that a trimmer-cutter made from a forged body and suitably tempered presents a series of blades in which the metal at the inner side wall of the blade is softer than at the outer side wall of the blade, or, in other words, when the segmental blades are tempered the exterior side of each blade where the forged skin of the body has been removed to give definite shape to the blade hardens more than the interior wall of the blade where the forged skin remains, and thereby the interior wall of each blade is left softer than the exterior wall, this being a matter of very considerable importance and value, for the reason that the blades, owing to this unevenness of temper, are less liable to break, and they may also be ground more readily, the softer the interior enabling the grinding to be done in less time.

It will be obvious that I may use one or more dies for shrinking the diameter of the annular flange of the forging here described, and in practice it will be understood that the flange is somewhat thicker, due to the circumferential shrinking; but I have not herein thought it necessary to exactly figure the extent of this thickening, and this tendency to thicken is somewhat offset by the downward-sliding action of the moving die.

Having described my invention, what I claim as new, and desire to secure by Letters Patent, is—

1. A frusto-conical cutter-body, the larger base of which presents solid material, the smaller base presenting an annular wall tapered at its interior, said cutter-body being formed by forging first into a frusto-conical body having the smaller base solid, and thereafter subjecting the annular wall of the larger base to compression, which shall contract said annular wall to form the smaller base of the cutter-body.

2. A forged cutter-body for rotary trimmer-cutters having a solid base portion and an annular wall extending therefrom, the exterior and interior surfaces of said wall tapering from the base toward each other.

3. The herein-described improvement in the method of manufacturing cutter-bodies, which consists in heating a piece of metal, forging the same while hot to present a frusto-conical shape with a central hub, the smaller base of the body presenting a solid web of material, the larger base surrounding said hub presenting an annular wall, and thereafter subjecting the annular wall of said larger base to the action of a die which shall contract said annular wall uniformly circumferentially about said hub, thus bringing said annular wall into a compass to constitute the smaller base of the frusto-conical body, leaving what was the smaller base the larger base, substantially as described.

4. The herein-described improvement in the method of manufacturing cutter-bodies, which consists in heating a piece of metal, forging the same while hot to present a frusto-conical shape, the smaller base of the body presenting a solid web of material, the larger base presenting an annular wall, said wall tapering from its outer end inwardly toward said smaller base, and thereafter subjecting said annular wall to the action of a compressing-die tapered interiorly and moving onto said frusto-conical body in the direction of its length, said die acting gradually on said annular wall circumferentially to compress or shrink the diameter of said annular wall causing it to constitute the smaller base of a frusto-conical body, said smaller base being left to present an annular wall tapering from its end outwardly toward the larger base of said body, substantially as described.

5. The herein-described improvement in the method of manufacturing cutter-bodies, which consists in heating a piece of metal, forging the same while hot to present a frusto-conical shape with an interior centrally-located hub, the smaller base of the body presenting a solid web of material, the larger base presenting an annular wall, and thereafter subjecting the annular wall of said larger base to the action of a die which shall contract said smaller wall uniformly circumferentially, thus bringing said wall toward said central hub to constitute the smaller base of the frusto-conical body, leaving what was the smaller base the larger base, substantially as described.

In testimony whereof I have signed my name to this specification in the presence of two subscribing witnesses.

EUGENE CHILDS.

Witnesses:
GEO. W. GREGORY,
MARGARET A. DUNN.